(No Model.)

W. G. HOWELL.
IRON AND STEEL FAGOT.

No. 276,139. Patented Apr. 17, 1883.

Attests:

Inventor
William G. Howell
By his atty

UNITED STATES PATENT OFFICE.

WILLIAM G. HOWELL, OF PHILADELPHIA, PENNSYLVANIA, ASSIGNOR TO WILLIAM GERHARD, OF SAME PLACE.

IRON AND STEEL FAGOT.

SPECIFICATION forming part of Letters Patent No. 276,139, dated April 17, 1883.

Application filed February 25, 1882. (No model.)

*To all whom it may concern:*

Be it known that I, WILLIAM G. HOWELL, of the city and county of Philadelphia, and State of Pennsylvania, have invented an improvement in the manufacture of bars of small section from combined iron and steel or iron-covered steel, of which the following is a specification.

The object of my invention is to construct a small fagot consisting of a steel billet inclosed in an envelope of iron puddle or scrap bar in such a manner that it may be rolled into a small bar of combined iron and steel—such as a horseshoe-bar, wire rod, or other bar of small section—at a single heat. By using puddle-bar in place of refined wrought-iron I have a material incorporated with all the flux (silica) necessary to insure a perfect weld when the said puddle-bars are made into the pile with the steel, and after being brought to a welding temperature passed between the rolls. The iron in the form of puddle-bar not having yet been purified of the silica, it is owing to the presence of this element that I am enabled to use thin sheets or bars of iron in making the pile, and yet secure a perfect weld between the iron and steel and iron to iron.

My invention consists in forming an envelope for the steel billet out of two bars rolled from a puddle or a scrap ball, or a scrap pile, said bars being formed into channel or angle iron in such a manner that they will together form a complete and close envelope to the steel billet.

Figure 1:
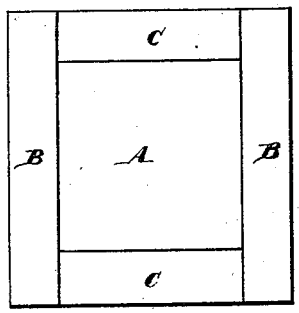
Figure 2:
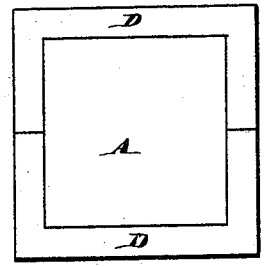
Figure 3:
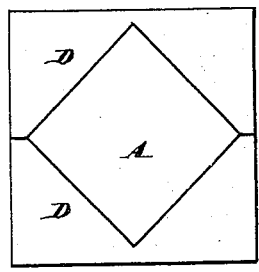
Figure 4:
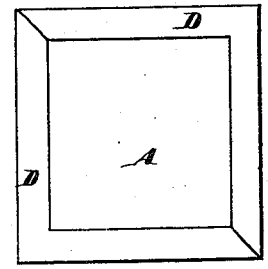

Reference being now had to the drawings, Figure 1 represents a fagot or pile of steel surrounded by bars of scrap or puddled iron, as such fagots were made for the purpose of being rolled into bars of combined iron and steel prior to my invention; Figs. 2, 3, and 4 represent fagots for making bars of combined iron and steel, said fagots being made according to my invention, and showing the different modifications thereof.

A represents the steel billet or billets constituting the interior of the fagot.

B B and C C in Fig. 1 are the puddle or scrap bars of iron forming the outside or envelope of the pile of the fagot as the same was made prior to my invention.

D and D in Figs. 2, 3, and 4 are the channel and angle irons, made of puddle and scrap bar according to my invention.

Heretofore in making fagots to be rolled into combined iron and steel or iron-covered steel it has been found impracticable to make the same of a smaller section than a square of from three and three-fourths to four inches in section, and at the same time preserve the proper proportion between the iron envelope and the steel billet inclosed therein. This limitation of the size of the fagot was due to the fact that the iron bars, which constituted the sides B B and C C of the fagot and which were rolled directly from the puddle-ball, could not be made a less thickness than about one-half inch, on account of the crude condition of the material. It has been found impracticable to roll such a fagot into bars of small section at a single heat, and the necessity of reheating has added largely to the cost of production of such small bars.

I have discovered that by rolling the puddle bar or bar of similar material into the form of channel or angle iron it may be reduced to a much less thickness than is possible with a straight bar, a thickness of about a quarter of an inch being obtainable in this manner under the same conditions under which a half-inch is obtainable by the old method. It is obvious, therefore, that my improved fagot may be made of from one-quarter to one-third of the size of the old fagot and yet retain the same proportion between the steel and iron envelope, and from these small fagots bars of the least section desirable may be rolled at a single heat.

Another obvious advantage of my improved fagot is that there are but two joints between the sections of the iron envelope, instead of four, as in the old form, and hence the danger of an imperfect joint or union is diminished by one-half; and it is clear, also, that there is less danger of the steel being burned or decarbonized when the fagot is heated, the envelope being from the first more perfect than in the old fagot.

Another advantage belonging to my improved fagot is that all parts tend of themselves to keep in place, while the old fagot had to be held together by extraneous means—such as by binding it with a wire or a strip of hoop-iron—which means, even when employed, were not always efficient, since the wire or hoop-iron burned through before the fagot became welded together, thus allowing one or more of the sides to fall away from the fagot and exposing the steel billet to be burned and destroyed by the action of the fire.

In this application I do not claim the specific construction of the pile from which to make horseshoes, as that forms the subject-matter of another application bearing even date with this, this application being upon the general construction of piles of combined iron and steel, as set forth hereinbefore.

Having now described my invention, what I claim, and desire to secure by Letters Patent, is—

A fagot for rolling into a bar of combined iron and steel, or iron-covered steel, of which the iron envelope is made of two puddle-bars or bars of similar crude wrought-iron rolled into the form of channel or angle iron, substantially as shown and described.

In testimony of which invention I have hereunto set my hand this 23d day of February, A. D. 1882.

W. G. HOWELL.

Witnesses:
H. DuPont Gerhard,
A. J. D. Dixon.